US012250752B2

(12) United States Patent
Shimao

(10) Patent No.: US 12,250,752 B2
(45) Date of Patent: Mar. 11, 2025

(54) HEATER

(71) Applicant: KYOCERA Corporation, Kyoto (JP)

(72) Inventor: Tsubasa Shimao, Shenzhen (CN)

(73) Assignee: KYOCERA Corporation, Kyoto (JP)

( * ) Notice: Subject to any disclaimer, the term of this patent is extended or adjusted under 35 U.S.C. 154(b) by 852 days.

(21) Appl. No.: 17/286,102

(22) PCT Filed: Oct. 29, 2019

(86) PCT No.: PCT/JP2019/042403

§ 371 (c)(1),
(2) Date: Apr. 16, 2021

(87) PCT Pub. No.: WO2020/090827

PCT Pub. Date: May 7, 2020

(65) Prior Publication Data

US 2021/0385910 A1 Dec. 9, 2021

(30) Foreign Application Priority Data

Oct. 31, 2018 (JP) ................................ 2018-205492

(51) Int. Cl.
*H05B 3/06* (2006.01)
*F23Q 7/10* (2006.01)
*H05B 3/44* (2006.01)

(52) U.S. Cl.
CPC ................. *H05B 3/06* (2013.01); *F23Q 7/10* (2013.01); *H05B 3/44* (2013.01)

(58) Field of Classification Search
CPC .................................... H05B 3/06; H05B 3/44
USPC ................................ 219/534; 248/62, 49, 50
See application file for complete search history.

(56) References Cited

U.S. PATENT DOCUMENTS

| | | | | |
|---|---|---|---|---|
| 2,393,226 A * | 1/1946 | Allison | H01B 17/16 | 248/50 |
| 3,011,744 A * | 12/1961 | Morgan, Jr. | F21V 19/009 | 248/50 |
| 6,605,801 B2 | 8/2003 | Haussner et al. | | |
| 7,351,935 B2 | 4/2008 | Konishi | | |
| 2004/0178185 A1 | 9/2004 | Yoshikawa et al. | | |
| 2011/0271748 A1* | 11/2011 | Maeda | G01L 23/00 | 73/114.18 |
| 2012/0091669 A1* | 4/2012 | Lee | F16J 15/3272 | 277/631 |
| 2014/0070494 A1* | 3/2014 | Winkelmann | F16J 15/166 | 277/619 |

(Continued)

FOREIGN PATENT DOCUMENTS

| | | |
|---|---|---|
| FR | 2978219 A1 | 1/2013 |
| IN | 102889305 A | 1/2013 |

(Continued)

*Primary Examiner* — Eric S Stapleton
*Assistant Examiner* — Yeong Juen Thong
(74) *Attorney, Agent, or Firm* — Volpe Koenig

(57) ABSTRACT

A heater of the disclosure includes: an insulating base including a rod-shaped portion; a heat generating resistor located inside the insulating base; a fixing member which is cylindrical, wherein the insulating base is inserted into the fixing member; and a spacer which is belt-shaped, located between the rod-shaped portion and the fixing member, and surrounds the rod-shaped portion in a circumferential direction. The spacer includes a first end and a second end which face the first end.

3 Claims, 6 Drawing Sheets

(56) References Cited

U.S. PATENT DOCUMENTS

| | | | | |
|---|---|---|---|---|
| 2015/0292739 | A1* | 10/2015 | Harada | H05B 3/48 219/534 |
| 2016/0102649 | A1* | 4/2016 | Ohtani | F23Q 7/001 123/145 A |
| 2017/0212074 | A1* | 7/2017 | Oba | G01N 27/4077 |
| 2019/0076219 | A1* | 3/2019 | Von Mandach | A61C 7/04 |
| 2019/0301742 | A1* | 10/2019 | Sprowl | H05B 3/42 |
| 2019/0334323 | A1* | 10/2019 | Shimamura | H01T 13/32 |

FOREIGN PATENT DOCUMENTS

| | | | | |
|---|---|---|---|---|
| JP | 56-105119 | A | 8/1981 | |
| JP | 56-164224 | A | 12/1981 | |
| JP | 08-170646 | A | 7/1996 | |
| JP | 2004-251613 | A | 9/2004 | |
| JP | 2006-040882 | A | 2/2006 | |
| JP | 2018-120794 | A | 8/2018 | |
| KR | 101145863 | B1 * | 5/2012 | |
| WO | WO-2017080570 | A1 * | 5/2017 | F03B 11/006 |

* cited by examiner

HEATER

CROSS-REFERENCE TO RELATED APPLICATION

This application is a national stage entry according to 35 U.S.C. 371 of International Application No. PCT/JP2019/042403 filed on Oct. 29, 2019, which claims priority to Japanese Patent Application No. 2018-205492 filed on Oct. 31, 2018, the contents of which are entirely incorporated herein by reference.

TECHNICAL FIELD

The present disclosure relates to a heater for gas ignition used in an atmosphere in a combustion gas.

BACKGROUND

A heater for gas ignition is, for example, a heater provided in a residential heater in the United States of America, and includes an insulating base including a heat generating resistor thereinside. Since the heater for gas ignition is required to be located near an air blowing port of the heater when igniting a combustion gas, a fixing member is attached to the insulating base.

For example, Japanese Unexamined Patent Publication JP-A 2004-251613 (Patent Literature 1) discloses a heater having a structure in which an insulating base in which a heat generating resistor is embedded is attached to a cylindrical metal fitting via a cylindrical member.

In a heater of a related art, the whole inner periphery of a cylindrical member is in close contact with an insulating base, and the cylindrical member is fitted to a cylindrical metal fitting. In such a heater, the insulating base may be damaged by thermal stress caused by a difference in thermal expansion between the insulating base and the cylindrical metal fitting when the temperature rises or falls.

SUMMARY

A heater of one aspect of the disclosure includes: an insulating base including a rod-shaped portion;

a heat generating resistor located inside the insulating base;

a fixing member which is cylindrical, wherein the insulating base is inserted into the fixing member; and a spacer which is belt-shaped, located between the rod-shaped portion and the fixing member, and surrounds the rod-shaped portion in a circumferential direction, the spacer including a first end and a second end which face the first end.

BRIEF DESCRIPTION OF DRAWINGS

Other and further objects, features, and advantages of the invention will be more explicit from the following detailed description taken with reference to the drawings wherein.

DETAILED DESCRIPTION

Hereinafter, a heater of the embodiment will be described in detail with reference to the drawings.

Figure 1:
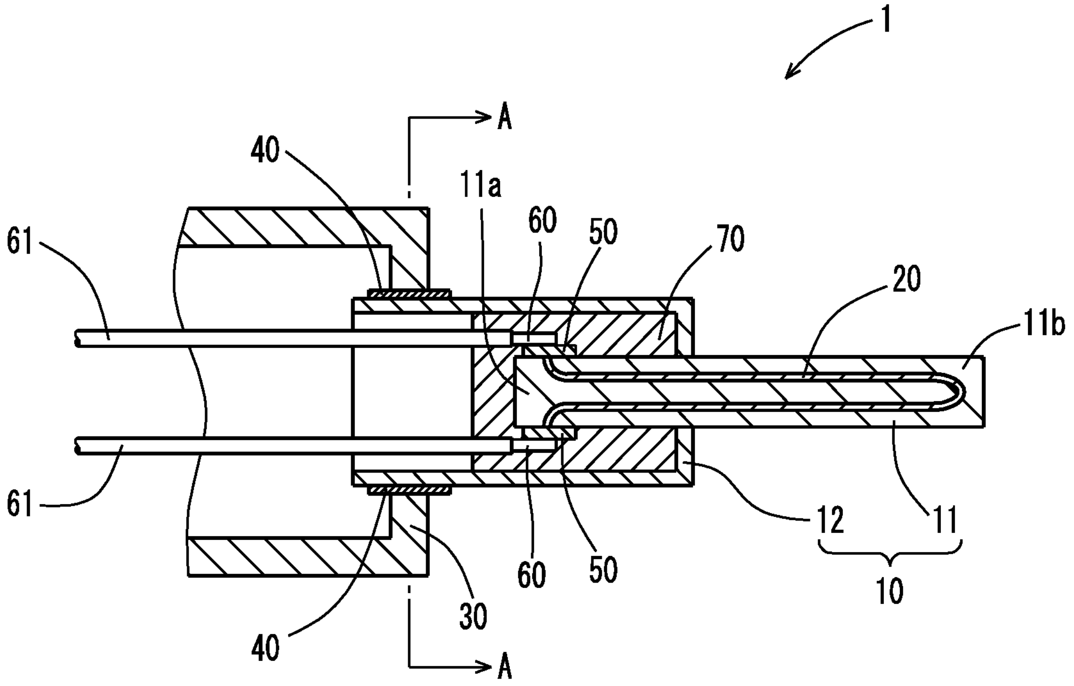
FIG. 1 is a cross-sectional view illustrating a heater according to an embodiment of the disclosure.
Figure 2:
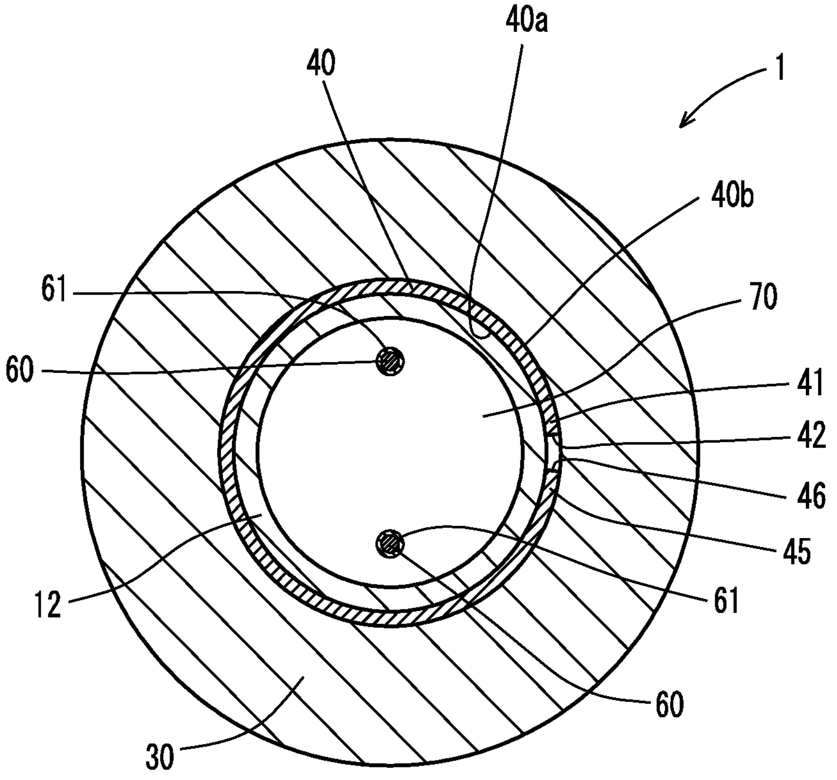
FIG. 2 is a cross-sectional view taken along the line A-A of FIG. 1.
Figure 3:
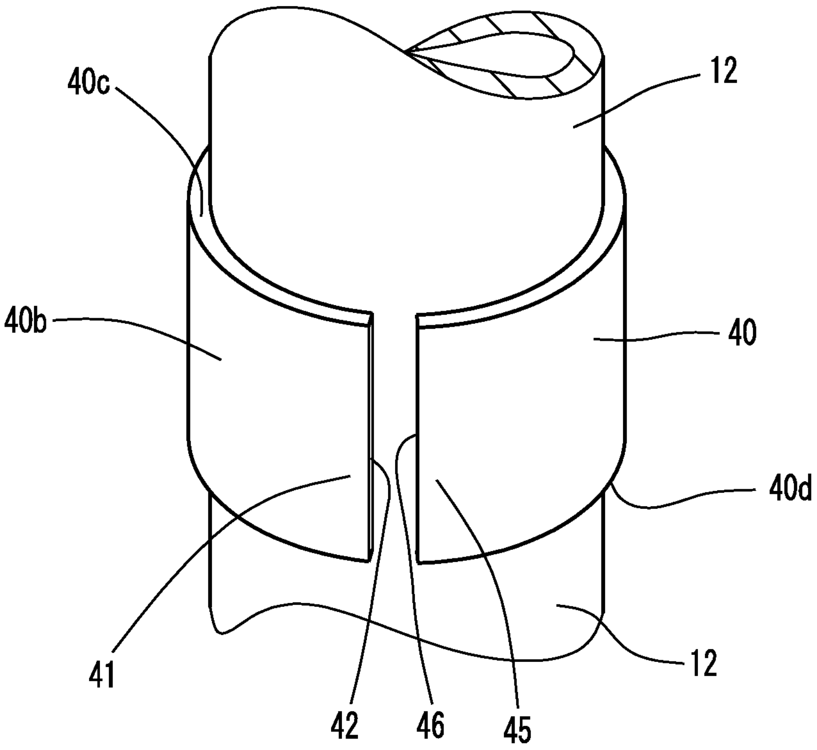
FIG. 3 is a perspective view illustrating an excerpt of a part of the heater according to the embodiment of the disclosure.

FIG. 1 is a cross-sectional view illustrating a heater according to an embodiment of the disclosure, FIG. 2 is a cross-sectional view taken along the line A-A of FIG. 1, and FIG. 3 is a perspective view illustrating an excerpt of a part of the heater according to the embodiment of the disclosure. FIG. 3 illustrates an excerpt of a ceramic cylinder of an insulating base and a spacer.

A heater 1 of the embodiment includes an insulating base 10, a heat generating resistor 20, a fixing member 30, and a spacer 40.

The insulating base 10 is an electrically insulating member including a rod-shaped portion. The insulating base 10 includes a ceramic body 11 and a ceramic cylinder 12. The ceramic body 11 is a member having a shape such as a plate shape, a round bar shape, and a square bar shape. The ceramic cylinder 12 is a member having a shape such as a cylindrical shape and a square cylindrical shape. The ceramic cylinder 12 has a rod-shaped outer shape, and forms a rod-shaped portion in the heater 1 of the embodiment (hereinafter, the rod-shaped portion may be referred to as the ceramic cylinder 12).

The ceramic body 11 is a member in which the heat generating resistor 20 is embedded. By locating the heat generating resistor 20 inside the ceramic body 11, environmental resistance of the heat generating resistor 20 can be improved.

The ceramic body 11 is formed of ceramics having an electrical insulation property. As the ceramics used in the ceramic body 11, for example, there are alumina ceramics, silicon nitride ceramics, aluminum nitride ceramics, and silicon carbide ceramics.

In the case where the ceramic body 11 is formed of silicon nitride ceramics, the ceramic body 11 can be formed with excellent strength, toughness, insulation, and heat resistance. The ceramic body 11 formed of silicon nitride ceramics can be manufactured by the following method. First, silicon nitride serving as a main component is mixed with $SiO_2$ whose amount is adjusted so that as a sintering aid, an amount of a rare earth element oxide such as $Y_2O_3$, $Yb_2O_3$ or $Er_2O_3$ becomes 5 to 15% by mass, an amount of $Al_2O_3$ becomes 0.5 to 5% by mass, and an amount of $SiO_2$ contained in a sintered body becomes 1.5 to 5%, and firing is performed at a temperature of 1650 to 1780° C. after performing molding in a predetermined shape, such that the ceramic body 11 formed of silicon nitride ceramics can be manufactured. For example, hot press firing can be used for firing.

In the case where silicon nitride ceramics are used for the ceramic body 11 and a compound such as Mo or W is used for the heat generating resistor 20, $MoSi_2$ or $WSi_2$ may be further mixed into the ceramic body 11. By dispersing the metal silicide used for the heat generating resistor 20 on the insulating base 10, a coefficient of thermal expansion of the ceramic body 11 and a coefficient of thermal expansion of the heat generating resistor 20 can be made close to each other. As a result, it is possible to reduce thermal stress caused by a difference in the thermal expansion between the heat generating resistor 20 and the ceramic body 11 when the temperature of the heater 1 rises or falls.

In the case where the shape of the ceramic body 11 is a plate shape, the ceramic body 11 has, for example, a length of 20 to 60 mm, a width of 3 to 12 mm, and a thickness of 0.5 to 6 mm.

One end portion 11*a* of the ceramic body 11 is inserted into the ceramic cylinder 12. The ceramic cylinder 12 surrounds the one end portion 11*a* of the ceramic body 11. The ceramic cylinder 12 is formed of, for example, a ceramic material having an electrical insulation property such as alumina or silica. In the embodiment, the ceramic cylinder 12 has a cylindrical shape, and a dimension thereof is, for example, 20 to 60 mm in length, 5 to 15 mm in inner diameter, and 6 to 20 mm in outer diameter. In the embodiment, for example, as illustrated in FIG. 1, the inner diameter of the ceramic cylinder 12 becomes small at an end portion thereof into which the one end portion 11*a* of the ceramic body 11 is inserted. Accordingly, the ceramic body 11 is easily fixed to the ceramic cylinder 12.

The heat generating resistor 20 is a member that generates heat by application of a current. The current flows by applying a voltage to the heat generating resistor 20, and the heat generating resistor 20 generates heat. The heat generated by the heat generation is transmitted to the inside of the ceramic body 11, and a surface temperature of the ceramic body 11 becomes high. Accordingly, the heater 1 functions by transferring the heat from the surface of the ceramic body 11 to a combustion gas which is an object to be heated.

The heat generating resistor 20 is located inside the ceramic body 11. As illustrated in FIG. 1, for example, a longitudinal cross section (a cross section parallel to a length direction of the heat generating resistor 20) of the heat generating resistor 20 may have a U-shape including a folded-back portion. A cross section (a cross section perpendicular to the length direction of the heat generating resistor) of the heat generating resistor 20 may have, for example, a circular shape, an elliptical shape, a rectangular shape, or any other shapes. The heat generating resistor 20 is not required to have a constant cross-sectional area over the whole length. For example, an area of the cross section of the heat generating resistor 20 at the folded-back portion may be smaller or larger than an area of the cross section thereof at a portion other than the folded-back portion.

The heat generating resistor 20 contains, for example, a carbide such as W, Mo or Ti, a nitride or a silicide as a main component. In the case where the ceramic body 11 is formed of silicon nitride ceramics, the heat generating resistor 20 may contain tungsten carbide as a main component. As a result, the coefficient of thermal expansion of the ceramic body 11 and the coefficient of thermal expansion of the heat generating resistor 20 can be made close to each other, such that the heat resistance of the heat generating resistor 20 can be improved.

In the case where the ceramic body 11 is formed of silicon nitride ceramics, the heat generating resistor 20 may contain tungsten carbide as a main component, and silicon nitride may be added in an amount of 20% by mass or more to the heat generating resistor 20. By adding silicon nitride to the heat generating resistor 20, the coefficient of thermal expansion of the heat generating resistor 20 and the coefficient of thermal expansion of the ceramic body 11 can be made close to each other. As a result, it is possible to reduce the thermal stress caused by the difference in the thermal expansion between the heat generating resistor 20 and the ceramic body 11 when the temperature of the heater rises or falls.

For example, as illustrated in FIG. 1, the heater 1 further includes two conductor layers 50, two lead terminals 60, and a sealing material 70.

The conductor layer 50 is a member for electrically connecting the heat generating resistor 20 and an external power source (not illustrated). The conductor layer 50 functions as an electrode portion of the heater 1. The conductor 50 is electrically connected to the heat generating resistor 20. The conductor layer 50 is provided on a surface near the one end portion 11*a* of the ceramic body 11, and is located inside the ceramic cylinder 12. For example, the conductor layer 50 is formed of a metal material such as Ag and Cu. The conductor layer 50 is formed, for example, by screen printing. A shape of a surface of the conductor layer 50 is, for example, a quadrangular shape. For example, the conductor layer 50 has a length of 2 to 10 mm, a width of 2 to 8 mm, and a thickness of 20 to 200 μm in the length direction of the ceramic cylinder 12.

The lead terminal 60 is a member for transmitting electricity from the external power source to the heat generating resistor 20. The two lead terminals 60 are respectively connected to the two conductor layers 50. One end of the lead terminal 60 is connected to the conductor layer 50, and the other end thereof is drawn out to the outside of the ceramic cylinder 12. The lead terminal 60 drawn out to the outside of the ceramic cylinder 12 is connected to the external power source. The lead terminal 60 and the conductor layer 50 are connected to each other by, for example, a brazing material. As the brazing material, for example, silver brazing, gold-cooper brazing, and silver-copper brazing can be used. The lead terminal 60 is formed of, for example, Ni. In the lead terminal 60, a region other than a portion joined to the conductor layer 50 or a portion connected to the external power source may be covered with an insulating tube 61. The tube 61 is formed of, for example, a resin material. Examples of the resin material used for the tube 61 include a resin material having excellent heat resistance such as fluororesin.

The sealing material 70 is a member for protecting the conductor layer 50 and the lead terminal 60 together with the ceramic cylinder 12. The sealing material 70 is provided at an end portion of the ceramic cylinder 12 into which the ceramic body 11 is inserted. The sealing material 70 seals the end portion of the ceramic cylinder 12 together with the ceramic body 11. As a result, when the other end portion 11*b* of the ceramic body 11 on a side opposite to the one end portion 11*a* thereof is disposed in the atmosphere in the combustion gas, the combustion gas can be suppressed from entering the inside of the ceramic cylinder 12. The sealing material 70 is formed of, for example, a ceramic material such as alumina and silica. The sealing material 70 is provided to close an opening surface of the ceramic cylinder 12 through which the ceramic body 11 is inserted. A thickness of the sealing material 70 in the length direction of the ceramic cylinder 12 is, for example, 10 to 60 mm.

The fixing member 30 is a member for easily attaching the ceramic cylinder 12 to a main body portion of the heater. The fixing member 30 is cylindrical wherein the ceramic cylinder 12 is inserted into the fixing member 30. For example, as illustrated in FIG. 1, the fixing member 30 surrounds one end portion of the ceramic cylinder 12. An inner diameter of the fixing member 30 becomes small at an end portion thereof into which the ceramic cylinder 12 is inserted. For example, the fixing member 30 is formed of a metal material such as stainless steel or an iron-cobalt-nickel alloy. In the case where the fixing member 30 is formed of stainless steel, the fixing member 30 having excellent corrosion resistance can be provided.

The spacer 40 is belt-shaped (a belt plate-shaped), and is located between the ceramic cylinder 12 and the fixing member 30. For example, as illustrated in FIGS. 2 and 3, the spacer 40 surrounds the ceramic cylinder 12 in a circumferential direction, and includes an inner peripheral surface 40*a* on a side of the ceramic cylinder 12 and an outer peripheral surface 40*b* on a side opposite to the inner peripheral surface 40*a*. For example, as illustrated in FIG. 3, the spacer 40 includes one side surface (hereinafter, also referred to as a first side surface) 40*c*, which extends along the circumferential direction of the ceramic cylinder 12 and connects the inner peripheral surface 40*a* and the outer peripheral surface 40*b*, and the other side surface (hereinafter, also referred to as a second side surface) 40*d* on a side opposite to the first side surface 40*c*.

For example, as illustrated in FIG. 3, the spacer 40 has a thickness in a radial direction of the ceramic cylinder 12. The spacer 40 includes one end (hereinafter, also referred to as a first end) 41 and the other end (hereinafter, also referred to as a second end) 45 facing each other in the circumferential direction of the ceramic cylinder 12. The first end 41 includes one end surface (hereinafter, also referred to as a first end surface) 42 facing the second end 45. The second end 45 includes the other end surface (hereinafter, also referred to as a second end surface) 46 facing the first end 41. For example, as illustrated in FIGS. 2 and 3, the first end surface 42 and the second end surface 46 may face each other with a space therebetween.

The spacer 40 is formed of, for example, a metal material and a ceramic material. Examples of the metal material used in the spacer 40 include iron, an iron alloy such as SUS, a Ni alloy, and an Al alloy. Examples of the ceramic material used in the spacer 40 include alumina, zirconia, and silicon nitride.

In the heater 1 of the embodiment, the spacer 40 is not provided over the whole circumference of the ceramic cylinder 12, and includes the first end 41 and the second end 45 which faces the first end 41. As a result, since the spacer 40 can expand or contract in the circumferential direction of the ceramic cylinder 12 when the temperature of the heater 1 rises or falls, it is possible to suppress occurrence of damage to the insulating base 10 caused by thermal stress caused by a difference in thermal expansion between the insulating base 10 and the fixing member 30. As a result, the heater 1 having excellent long-term reliability can be provided.

FIG. 3 illustrates an example in which a length of the spacer 40 in the length direction of the ceramic cylinder 12 is shorter than a length of the spacer 40 in the circumferential direction of the ceramic cylinder 12, and the length of the spacer 40 in the length direction of the ceramic cylinder 12 may be configured to be longer than the length of the spacer 40 in the circumferential direction of the ceramic cylinder 12. In other words, the spacer 40 may have a cylindrical shape including a slit extending in the length direction of the ceramic cylinder 12.

Hereinafter, a heater according to another embodiment of the disclosure will be described.

Figure 4:
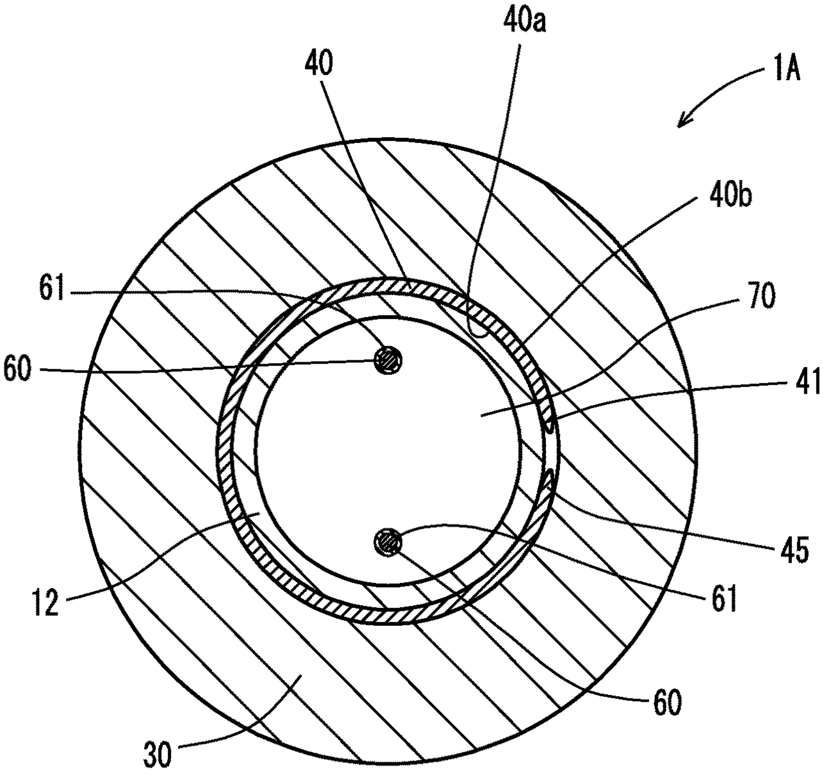
FIG. 4 is a cross-sectional view illustrating a heater according to another embodiment of the disclosure.

FIG. 4 is a cross-sectional view of a heater according to another embodiment of the disclosure. FIG. 4 corresponds to the cross-sectional view illustrated in FIG. 2. Since a configuration of the first end 41 and the second end 45 of the spacer 40 of a heater 1A of the embodiment illustrated in FIG. 4 is different from that of the heater 1 of the embodiment and others have the same configuration, detailed description of the same configuration will be omitted.

In the heater 1A of the embodiment, the spacer 40 is configured so that a thickness of the first end 41 or the second end 45 is smaller than a thickness of a portion other than the first end 41 or the second end 45. According to such a configuration, even when the first end 41 and the second end 45 contact with each other under a heat cycle in which the heater 1A repeatedly raises and lowers the temperature, thermal stress acting on the first end 41 and the second end 45 can be dispersed. Accordingly, damage to the spacer 40 can be suppressed, and as a result, direct contact between the insulating base 10 and the fixing member 30 can be suppressed. Consequently, the long-term reliability of the heater 1A can be improved.

According to the spacer 40 having the above-described configuration, since a gap is formed between the ceramic cylinder 12 and the first end 41 and between the ceramic cylinder 12 and the second end 45, a force with which the spacer tightens the ceramic cylinder 12 can be suppressed from becoming too large under the heat cycle. As a result, since damage to the ceramic cylinder 12 can be suppressed, the long-term reliability of the heater 1A can be improved.

The spacer 40 may have a configuration in which a thickness of at least one of the first end 41 and the second end 45 is smaller than a thickness of a portion other than the at least one thereof. For example, as illustrated in FIG. 4, the spacer 40 may have a configuration in which both the thickness of the first end 41 and the second end 45 is smaller than the thickness of a portion other than the first end 41 and the second end 45. According to such a configuration, the damage to the spacer 40 and the ceramic cylinder 12 can be effectively suppressed.

Figure 5:
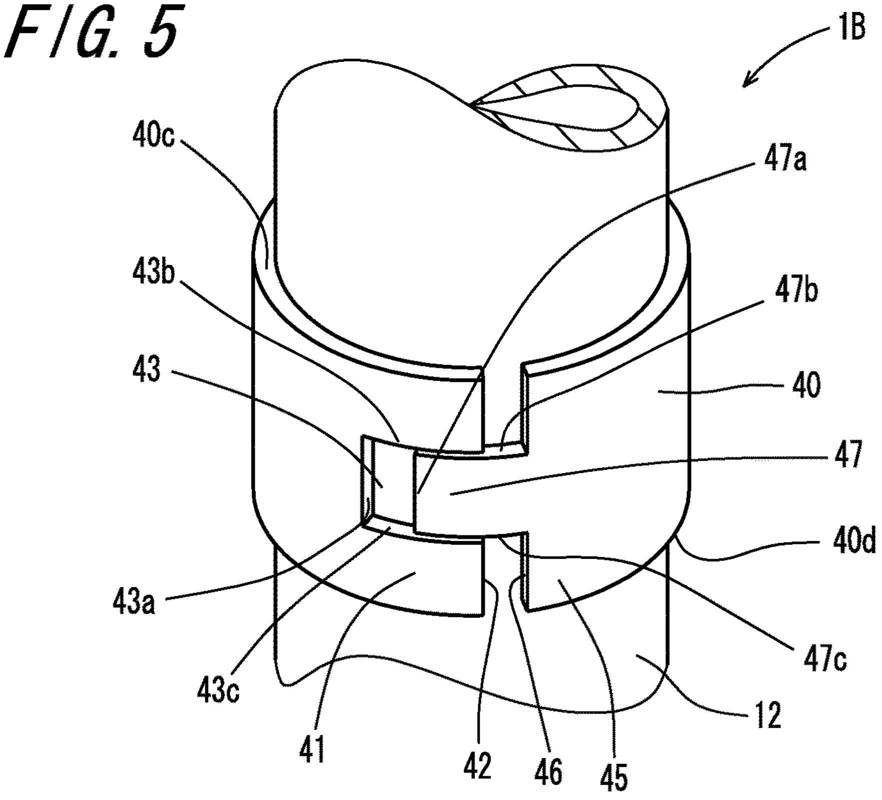
FIG. 5 is a perspective view illustrating an excerpt of a part of a heater according to another embodiment of the disclosure.
Figure 6:
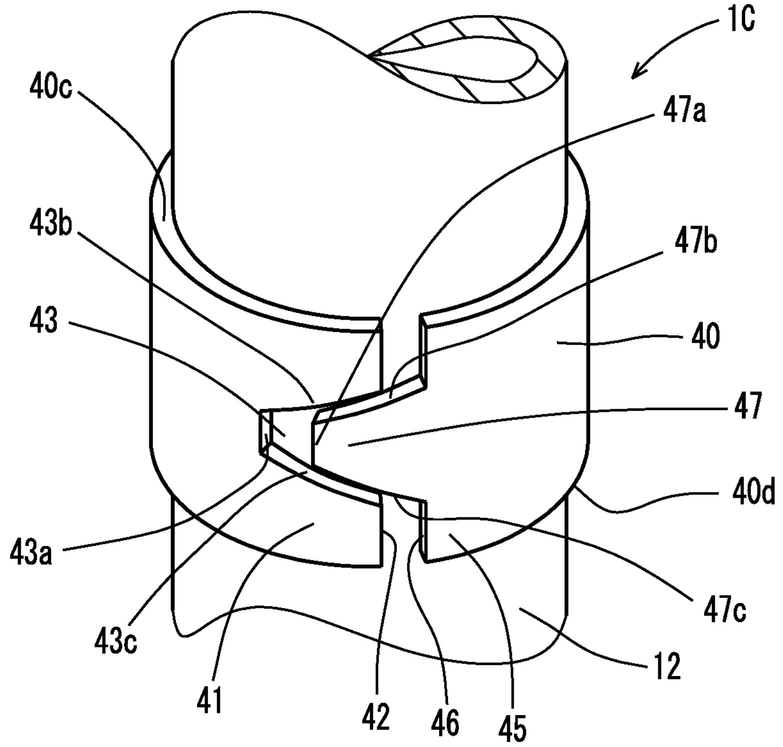
FIG. 6 is a perspective view illustrating an excerpt of a part of a heater according to another embodiment of the disclosure.

FIG. 5 is a perspective view illustrating an excerpt of a part of a heater according to another embodiment of the disclosure, and FIG. 6 is a perspective view illustrating an excerpt of a part of a heater according to another embodiment of the disclosure. In FIGS. 5 and 6, excerpts of the ceramic cylinder of the insulating base and the spacer are illustrated. Since a configuration of the first end 41 and the second end 45 of the spacer 40 of a heater 1B of the embodiment illustrated in FIG. 5 is different from that of the heater 1 of the above-described embodiment and others have the same configuration, detailed description of the same configuration will be omitted. Regarding a heater 1C of the embodiment illustrated in FIG. 6, the description of the heater 1C overlapping with the description of the heater 1B will be omitted.

The heater 1B of the embodiment has a configuration in which the first end 41 of the spacer 40 includes a recessed portion 43. As illustrated in FIG. 5, for example, the recessed portion 43 is recessed from the first end surface 42 in the circumferential direction of the ceramic cylinder 12, and a bottom portion 43*a* of the recessed portion 43 extends along the length direction of the ceramic cylinder 12. The recessed portion 43 includes inner edge portions 43*b* and 43*c* that respectively connect opposite ends of the bottom portion 43*a* in the length direction of the ceramic cylinder 12 and the first end surface 42.

The heater 1B of the embodiment has a configuration in which the second end 45 of the spacer 40 includes a protruding portion 47. The protruding portion 47 protrudes from the second end surface 46 in the circumferential direction of the ceramic cylinder 12, and a top portion 47*a* extends along the length direction of the ceramic cylinder 12. The top portion 47*a* includes outer edge portions 47*b* and 47*c* that respectively connect opposite ends of the top portion 47*a* in the length direction of the ceramic cylinder 12 and the second end surface 46. The recessed portion 43 of the first end 41 and the protruding portion 47 of the second end 45 have complementary shapes. For example, as illustrated in FIG. 5, the protruding portion 47 is located in the recessed portion 43.

According to the heater 1B of the embodiment, a relative positional deviation between the first end 41 and the second end in the length direction of the ceramic cylinder 12 can be suppressed under the heat cycle. As a result, it is possible to suppress the insulating base 10 and the fixing member 30 from directly contacting with each other without via the spacer 40. Consequently, the damage to the insulating base 10 is suppressed, thereby making it possible to improve the long-term reliability of the heater 1B.

For example, as illustrated in FIG. 5, the spacer 40 may have a configuration in which the bottom portion 43*a* of the recessed portion 43 and the top portion 47*a* of the protruding portion 47 extend straight along the length direction of the ceramic cylinder 12, and the straight top portion 47*a* faces the straight bottom portion 43*a*. According to such a configuration, in the case where the spacer 40 thermally expands when the temperature of the heater 1B rises and thus the top portion 47*a* and the bottom portion 43*a* contact with each other, stress caused by the contact between the top portion 47*a* and the bottom portion 43*a* acts substantially only in the circumferential direction of the ceramic cylinder 12, and does not act in the length direction of the ceramic cylinder 12. As a result, since the relative positional deviation between the first end 41 and the second end 45 in the length direction of the ceramic cylinder 12 can be suppressed under the heat cycle, it is possible to suppress the insulating base 10 and the fixing member 30 from directly contacting with each other without via the spacer 40. Consequently, the damage to the insulating base is suppressed, thereby making it possible to improve the long-term reliability of the heater 1B.

As illustrated in FIG. 6, for example, the recessed portion 43 may have a configuration in which a direction in which one inner edge portion 43*b* extends and a direction in which the other inner edge portion 43*c* extends are non-parallel. For example, as illustrated in FIG. 6, the protruding portion 47 may have a configuration in which a direction in which one outer edge portion 47*b* extends and a direction in which the other outer edge portion 47*c* extends are non-parallel. Even in such a configuration of the recessed portion 43 and the protruding portion 47, since the relative positional deviation between the first end 41 and the second end 45 can be suppressed, the damage to the insulating base 10 is suppressed, thereby making it possible to improve the long-term reliability of the heater 1C.

Figure 7A:
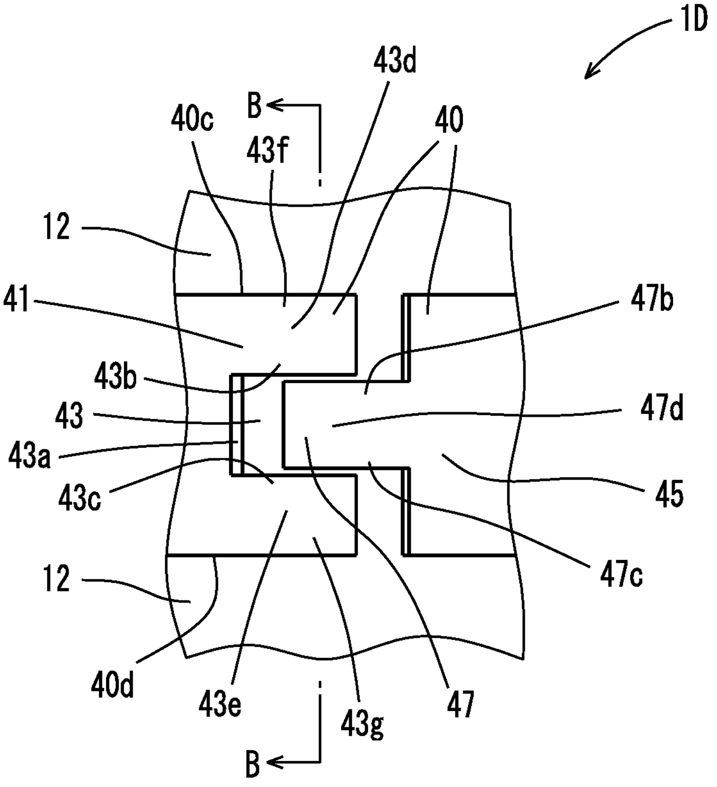
FIG. 7A is a front view illustrating an excerpt of a part of a heater according to another embodiment of the disclosure.
Figure 7B:
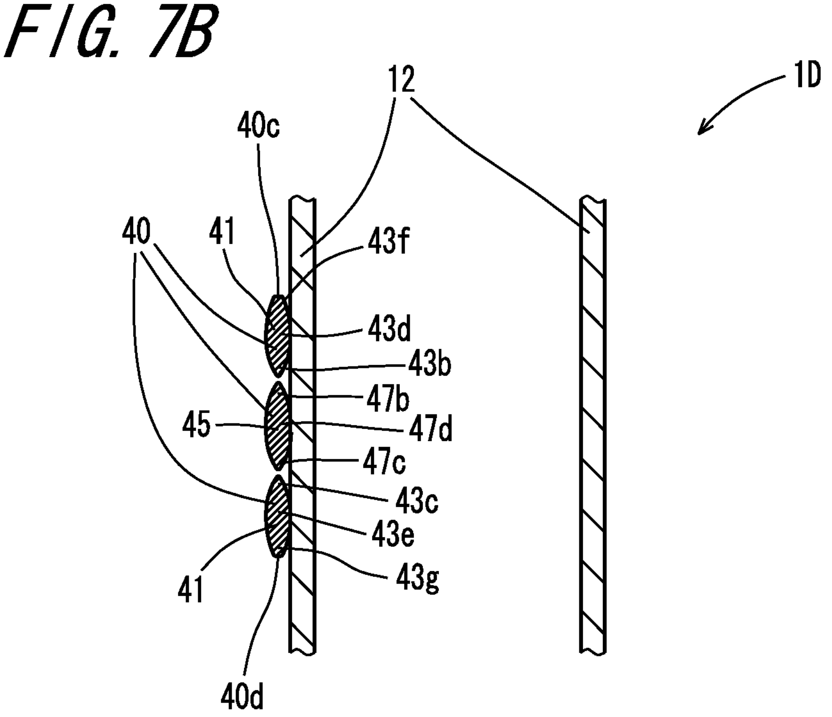
FIG. 7B is an end surface view taken along the line B-B of FIG. 7A.

FIG. 7A is a front view illustrating an excerpt of a part of a heater according to another embodiment of the disclosure, and FIG. 7B is an end surface view taken along the line B-B of FIG. 7A. FIGS. 7A and 7B illustrate excerpts of the ceramic cylinder of the insulating base and the spacer. In FIG. 7A, a portion where the recessed portion and the protruding portion of the spacer are engaged with each other is enlarged and illustrated. Since a configuration of the recessed portion 43 and the protruding portion 47 of a heater 1D of the embodiment illustrated in FIGS. 7A and 7B is different from that of the heater 1B of the above-described embodiment and others have the same configuration, detailed description of the same configuration will be omitted.

For example, as illustrated in FIGS. 7A and 7B, in the heater 1D of the embodiment, a thickness of the outer edge portions 47*b* and 47*c* of the protruding portion 47 in the length direction of the ceramic cylinder 12 is smaller than a thickness of a central portion 47*d* of the protruding portion 47 that is located in the recessed portion 43. Here, the central portion 47*d* refers to a portion located between the outer edge portion 47*b* and the outer edge portion 47*c* in the length direction of the ceramic cylinder 12.

According to the heater 1D of the embodiment, in the case where the spacer 40 thermally expands when the temperature of the heater 1D rises and thus the outer edge portions 47*b* and 47*c* of the protruding portion 47 and the inner edge portions 43*b* and 43*c* of the recessed portion 43 contact with each other, it is possible to increase a contact area between the outer edge portion 47*b* and the inner edge portion 43*b* and a contact area between the outer edge portion 47*c* and the inner edge portion 43*c*. As a result, since stress caused by the contact between the outer edge portions 47*b* and 47*c* and the inner edge portions 43*b* and 43*c* can be dispersed, occurrence of a crack in the spacer 40 is suppressed such that the damage to the spacer 40 can be suppressed. Consequently, the long-term reliability of the heater 1D can be improved.

For example, as illustrated in FIGS. 7A and 7B, the first end 41 may have a configuration in which a thickness of one inner edge portion 43*b* is smaller than a thickness of a central portion 43*d* which is located closer to a side of the first side surface 40*c* than the inner edge portion 43*b* in the length direction of the ceramic cylinder 12 (a vertical direction in FIGS. 7A and 7B). The first end 41 may have a configuration in which a thickness of the other inner edge portion 43*c* is smaller than a thickness of a central portion 43*e* which is located closer to a side of the second side surface 40*d* than the inner edge portion 43*c* in the length direction of the ceramic cylinder 12. According to such a configuration of the inner edge portions 43*b* and 43*c*, it is possible to further increase the contact area between the outer edge portions 47*b* and 47*c* and the inner edge portions 43*b* and 43*c*. As a result, since the stress caused by the contact between the outer edge portions 47*b* and 47*c* and the inner edge portions 43*b* and 43*c* can be effectively dispersed, the damage to the spacer 40 can be effectively suppressed. Consequently, the long-term reliability of the heater 1D can be improved.

For example, as illustrated in FIGS. 7A and 7B, the first end 41 may have a configuration in which a thickness of an outer edge portion 43*f* near the first side surface 40*c* is smaller than a thickness of the central portion 43*d*. The second end 45 may have a configuration in which a thickness of an outer edge portion 43*g* near the second side surface 40*d* of the ceramic cylinder 12 is smaller than a thickness of the central portion 43*e*. According to the configuration of the outer edge portions 43*f* and 43*g*, since a gap is formed between the ceramic cylinder 12 and the outer edge portions 43*f* and 43*g*, the force with which the spacer 40 tightens the ceramic cylinder 12 can be suppressed from becoming too large under the heat cycle. As a result, since the damage to the spacer 40 can be suppressed, the long-term reliability of the heater 1D can be improved.

Figure 8:
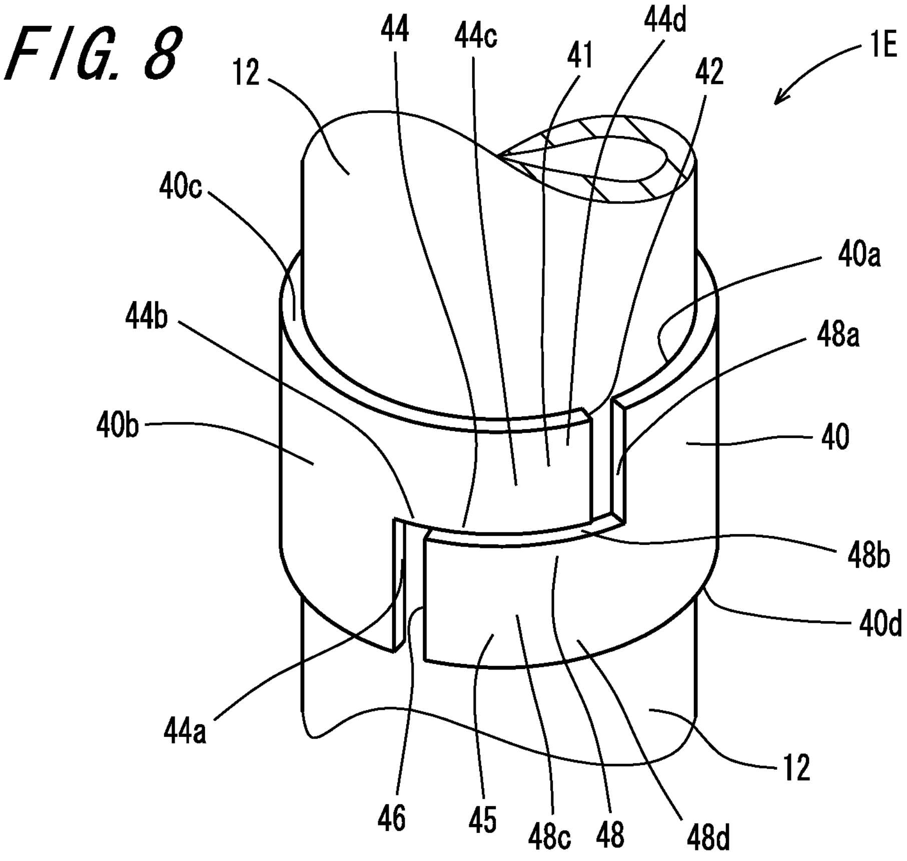
FIG. 8 is a perspective view illustrating an excerpt of a part of a heater according to another embodiment of the disclosure.
Figure 9:
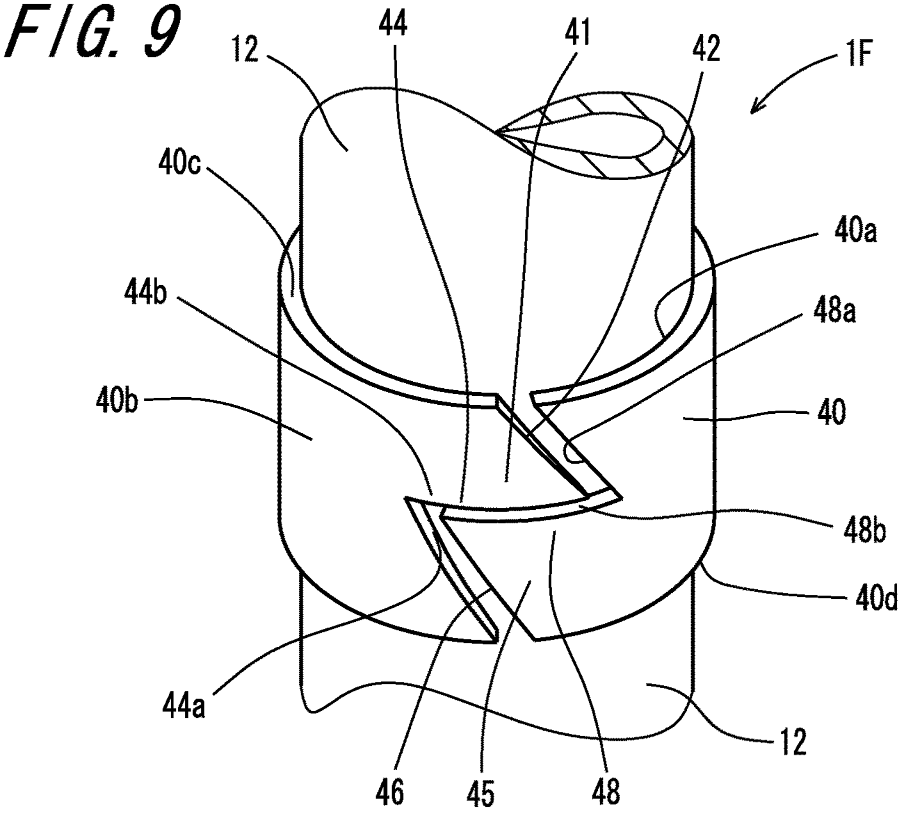
FIG. 9 is a perspective view illustrating an excerpt of a part of a heater according to another embodiment of the disclosure.
Figure 10:
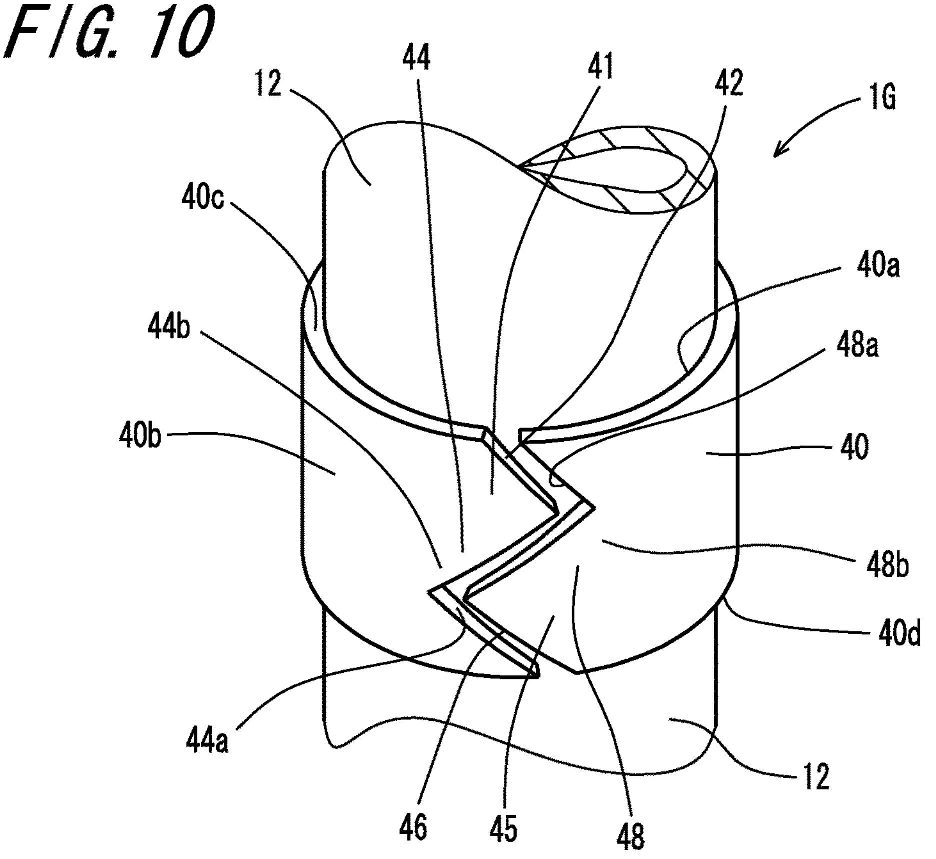
FIG. 10 is a perspective view illustrating an excerpt of a part of a heater according to another embodiment of the disclosure.

FIG. 8 is a perspective view illustrating an excerpt of a part of a heater according to another embodiment of the disclosure, FIG. 9 is a perspective view illustrating an excerpt of a part of a heater according to another embodiment of the disclosure, and FIG. 10 is a perspective view illustrating an excerpt of a part of a heater according to another embodiment of the disclosure. FIGS. 8, 9, and 10 illustrate excerpts of the ceramic cylinder of the insulating base and the spacer. Since a configuration of the first end 41 and the second end 45 of the spacer 40 of a heater 1E of the embodiment illustrated in FIG. 8 is different from that of the heater 1 of the above-described embodiment and others have the same configuration, detailed description of the same configuration will be omitted. Regarding a heater 1F of the embodiment illustrated in FIG. 9 and a heater 1G of the embodiment illustrated in FIG. 10, the description of the heaters 1F and 1G overlapping with the description of the heater 1E will be omitted.

In the heater 1E of the embodiment, the first end 41 includes a first notch portion 44, and the second end 45 includes a second notch portion 48.

For example, as illustrated in FIG. 8, the first notch portion 44 is open to the first end surface 42, the second side surface 40*d*, the outer peripheral surface 40*b*, and the inner peripheral surface 40*a* of the spacer 40. The first notch portion is recessed from the first end surface 42 in the circumferential direction of the ceramic cylinder 12, and a bottom portion 44*a* of the first notch portion 44 extends in the length direction of the ceramic cylinder 12. An outer edge portion 44*b* connecting one end of the bottom portion 44*a* on the side of the first side surface 40*c* and the first end surface 42 extends in the circumferential direction of the ceramic cylinder 12.

For example, as illustrated in FIG. 8, the second notch portion 48 is open to the second end surface 46, the first side surface 40*c*, the outer peripheral surface 40*b*, and the inner peripheral surface 40*a* of the spacer 40. The second notch portion 48 is recessed in the circumferential direction of the ceramic cylinder 12 from the second end surface 46 toward the first end surface 42, and a bottom portion 48*a* of the second notch portion 48 extends in the length direction of the ceramic cylinder 12. An outer edge portion 48*b* connecting one end of the bottom portion 48*a* on the side of the second side surface 40*d* and the second end surface 46 extends in the circumferential direction of the ceramic cylinder 12. The first notch portion 44 and the second notch portion 48 have a complementary shape, and for example, as illustrated in FIG. 8, the first notch portion 44 and the second notch portion 48 are engaged with each other.

According to the heater 1E of the embodiment, since the spacers 40 includes the first end 41 and the second end 45 facing each other such that the thermal stress caused by the difference in thermal expansion between the insulating base 10 and the fixing member 30 and acting on the insulating base 10 can be relaxed, the damage to the insulating base 10 can be suppressed. As a result, the heater 1E having excellent long-term reliability can be provided. According to the heater 1E of the embodiment, the first notch portion 44 and the second notch portion 48 are engaged with each other, thereby making it possible to suppress the relative positional deviation between the first end 41 and the second end 45 in the length direction of the ceramic cylinder 12 (a vertical direction in FIG. 8). Therefore, it is possible to suppress the insulating base 10 and the fixing member 30 from directly contacting with each other without via the spacer 40, and as a result, the damage to the insulating base 10 can be suppressed. Consequently, the long-term reliability of the heater 1E can be improved.

The first notch portion 44 may have a configuration in which a thickness of the outer edge portion 44*b* is smaller than a thickness of the central portion 44*c* of the first notch portion 44 that is engaged with the second notch portion 48. Here, the central portion 44*c* refers to a portion which is located closer to the side of the first side surface 40*c* than the outer edge portion 44*b* in the length direction of the ceramic cylinder 12. The second notch portion 48 may have a configuration in which a thickness of the outer edge portion 48*b* is smaller than a thickness of the central portion 48*c* of the second notch portion 48 that is engaged with the first notch portion 44. Here, the central portion 48*c* refers to a portion which is located closer to the side of the second side surface 40*d* than the outer edge portion 48*b* in the length direction of the ceramic cylinder 12. According to the configuration of the first notch portion 44 and the second notch portion 48 as described above, in the case where the spacer 40 thermally expands when the temperature of the heater 1E rises, and the outer edge portion 44*b* of the first notch portion 44 and the outer edge portion 48*b* of the second notch portion 48 contact with each other, a contact area between the outer edge portion 44*b* and the outer edge portion 48*b* can be increased and thus stress caused by the contact between the outer edge portion 44*b* and the outer edge portion 48*b* can be dispersed, such that occurrence of a crack in the spacer 40 is suppressed and the damage to the spacer 40 can be suppressed. As a result, the long-term reliability of the heater 1E can be improved.

The first end 41 may have a configuration in which a thickness of the outer edge portion 44*d* near the first side surface 40*c* of the ceramic cylinder 12 is smaller than a thickness of the central portion 44*c*. The second end 45 may have a configuration in which a thickness of the outer edge portion 48*d* near the second side surface 40*d* of the ceramic cylinder 12 is smaller than a thickness of the central portion 48*c*. According to the configuration of the outer edge portions 44*d* and 48*d* described above, since a gap is formed between the ceramic cylinder 12 and the outer edge portions 44*d* and 48*d*, the force with which the spacer 40 tightens the ceramic cylinder 12 can be suppressed from becoming too large under the heat cycle. As a result, since the damage to the spacer 40 can be suppressed, the long-term reliability of the heater 1E can be improved.

For example, as illustrated in FIG. 9, the first end surface 42 and the second end surface 46 may extend in a direction intersecting the length direction of the ceramic cylinder 12.

For example, as illustrated in FIG. 9, the bottom portion 44*a* of the first notch portion 44 and the bottom portion 48*a* of the second notch portion 48 may extend in the direction intersecting the length direction of the ceramic cylinder 12. A direction in which the bottom portion 44*a* of the first notch portion 44 extends and a direction in which the second end surface 46 extends may be parallel or non-parallel. A direction in which the bottom portion 48*a* of the second notch portion 48 extends and a direction in which the first end surface 42 extends may be parallel or non-parallel.

Even in a configuration of the first end 41 and the second end 45 illustrated in FIG. 9, since the thermal stress caused by the difference in thermal expansion between the insulating base 10 and the fixing member 30 and acting on the insulating base 10 can be relaxed, the damage to the insulating base 10 can be suppressed. Even in the configuration of the first end 41 and the second end 45 illustrated in FIG. 9, the relative positional deviation between the first end 41 and the second end 45 in the length direction of the ceramic cylinder 12 can be suppressed. As a result, since it is possible to suppress the insulating base 10 and the fixing member 30 from directly contacting with each other without via the spacer 40, the damage to the insulating base 10 can be suppressed.

For example, as illustrated in FIG. 10, the outer edge portion 44*b* of the first notch portion 44 and the outer edge portion 48*b* of the second notch portion 48 may extend in a direction intersecting the circumferential direction of the ceramic cylinder 12. Even in such a configuration of the first end 41 and the second end 45, the thermal stress acting on the insulating base 10 can be relaxed, and the relative positional deviation between the first end 41 and the second end 45 in the length direction of the ceramic cylinder 12 can be suppressed, such that the damage to the insulating base 10 can be suppressed.

While embodiments of the disclosure have been described in detail above, the disclosure is not limited to the above-described embodiments, and various modifications and improvements can be made within the scope not departing from the gist of the disclosure.

REFERENCE SIGNS LIST

1, 1A, 1B, 1C, 1D, 1E, 1F, 1G: Heater
10: Insulating base
11: Ceramic body
11*a*: One end portion
11*b*: Other end portion
12: Ceramic cylinder
20: Heat generating resistor
30: Fixing member
40: Spacer
40*a*: Inner peripheral surface
40*b*: Outer peripheral surface
40*c*: One side surface (First side surface)
40*d*: Other side surface (Second side surface)
41: One end (First end)
42: First end surface
43: Recessed portion
43*a*: Bottom portion
43*b*, 43*c*: Inner edge portion
43*d*, 43*e*: Central portion
43*f*, 43*g*: Outer edge portion
44: First notch portion
44*a*: Bottom portion
44*b*, 44*d*: Outer edge portion
44*c*: Central portion

45: Other end (Second end)
46: Second end surface
47: Protruding portion
47*a*: Top portion
47*b*, 47*c*: Outer edge portion
47*d*: Central portion
48: Second notch portion
48*a*: Bottom portion
48*b*, 48*d*: Outer edge portion
48*c*: Central portion
50: Conductor layer
60: Lead terminal
61: Tube
70: Sealing material

The invention claimed is:

1. A heater, comprising:
an insulating base including a ceramic body and a ceramic cylinder, wherein a first ceramic body end of the ceramic body is inserted in the ceramic cylinder;
a heat generating resistor located inside the ceramic body;
a cylindrical ring with an open center, wherein a first ceramic cylinder end of the ceramic cylinder is inserted into the open center and the cylindrical ring surrounds a portion of the ceramic cylinder; and
a spacer which is belt-shaped, located between the ceramic cylinder and the cylindrical ring, and surrounds the ceramic cylinder in a circumferential direction, wherein
the spacer comprising a first spacer end and a second spacer end which faces the first spacer end,
the first spacer end comprises a recessed portion,
the second spacer end comprises a protruding portion,
the protruding portion is located in the recessed portion, and includes a central portion located in the recessed portion and two outer edge portions, each of the two outer edge portions extend in a thickness direction away from the ceramic cylinder, and
a thickness of the outer edge portion in a length direction of the ceramic cylinder is smaller than a thickness of the central portion.

2. The heater according to claim 1, wherein
a thickness of the first spacer end or the second spacer end is smaller than a thickness of a portion of the spacer other than the first spacer end or the second spacer end.

3. The heater according to claim 1, wherein
the recessed portion comprises a straight bottom portion,
the protruding portion comprises a straight top portion, and
the straight top portion faces the straight bottom portion.

* * * * *